P. KILLIN.
Alarm Whistle.
No. 54,922.
Patented May 22, 1866.
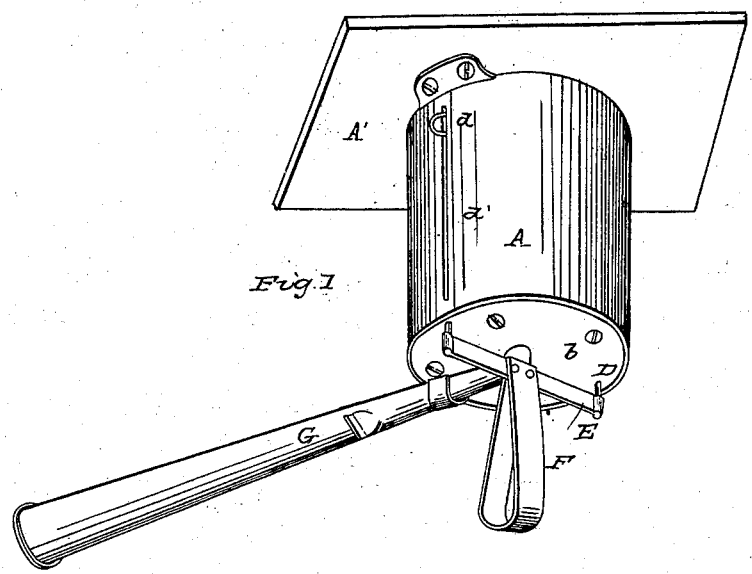
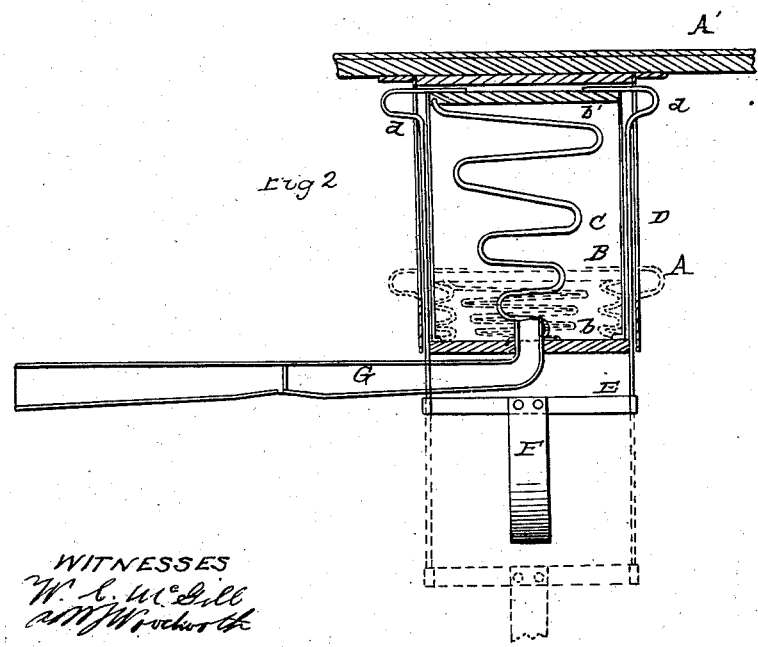
WITNESSES
INVENTOR
Patrick Killin

UNITED STATES PATENT OFFICE.

PATRICK KILLIN, OF MOUNT HEALTHY, OHIO.

IMPROVEMENT IN ALARM-WHISTLES.

Specification forming part of Letters Patent No. 54,922, dated May 22, 1866.

*To all whom it may concern:*

Be it known that I, PATRICK KILLIN, of Mount Healthy, Hamilton county, and State of Ohio, have invented a new and Improved Alarm-Whistle, of which the following is a full and clear description thereof, reference being had to the accompanying drawings, forming part of this specification.

My improvement relates to an apparatus which may be attached to the roof of a car, it being composed of a bellows in connection with a whistle or horn, by means of which warning is given to those upon the track.

Figure 1 represents a perspective view of my improved alarm-whistle attached to the roof of a car. Fig. 2 is a sectional view taken longitudinally, and showing the principal operating parts of the machine.

A is a cylindrical covering, made of thin metal or other suitable material, incasing a bellows, B, which is permanently secured to the lower plate, $b\ b$, being secured to the cylindrical covering A. The upper head, $b'$, of the bellows has attached to it the movable bars D, which are connected with the cross-bar E. A helicoidal spring, C, is placed between the lower and upper plates, $b$ and $b'$, of the bellows B. An opening in the center of lower plate, $b$, permits air to escape into the whistle or horn G.

The alarm-whistle is attached to wall or roof A', as shown in the perspective view, Fig. 1. To the ends of the cross-bar E are secured the rods D, the curved upper extremity of which act as guides in the slots $d'$ of the cylindrical covering. The rods D are attached to the upper head, $b'$, of the bellows, and also to the cross-bar E. To cross-bar E is secured the strap F.

Operation: When it is desirable to sound an alarm the strap F is drawn down, causing the bellows to expel the air through the whistle. The spring then moves backward, the upper plate, $b'$, causing an influx of air, to be again expelled. Thus by means of this device alarms or signals may be given upon street-cars or for domestic purposes.

Having described my invention and its operation, what I claim as new, and desire to secure by Letters Patent, is—

The bellows B in the cylindrical chamber A, the spring C, rods D, and whistle or horn G, constructed and operated as above described, and for the purpose set forth.

PATRICK KILLIN.

Witnesses:
W. C. McGILL,
A. J. WOODWORTH.